Patented Feb. 17, 1953

2,628,984

UNITED STATES PATENT OFFICE 2,628,984

PROCESS FOR THE MANUFACTURE OF PHENOLS AND KETONES

Basil Vivian Aller, Hull, Reginald Harold Hall, Carshalton, Denis Cheselden Quin, Epsom, and Karl Heinrich Walter Turck, Banstead, England, assignors to Hercules Powder Company, a corporation of Delaware No Drawing. Original application January 29, 1948, Serial No. 5,178. Divided and this application September 19, 1949, Serial No. 116,636. In Great Britain February 13, 1947

7 Claims. (Cl. 260—621)

This application is a divisional application from the U. S. application Serial No. 5,178 filed on January 29, 1948.

The invention relates to improvements in and a process for the production of phenols and refers in particular to the manufacture of phenols by the acid decomposition of peroxides obtained by the oxidation in the liquid phase by means of molecular oxygen containing gases of benzene homologues in which the substituents are one or more alkyl groups and one of which has a tertiary carbon atom in the alpha position to the benzene ring.

Hock and Lang have shown in Berichte, 1944, volume 77, page 257, that when isopropyl benzene is subjected to autoxidation with the concurrent exposure to short wave irradiation, isopropyl benzene peroxide is formed and that the free peroxide obtained by treating the oxidised reaction mixture with aqueous alkali solution and subsequent acidification of the purified alkali metal salt, can be decomposed by refluxing with a 10% sulphuric acid solution, whereby phenolic compounds as well as carbonyl compounds such as acetone are produced.

The present invention is based on the discovery that when benzene homologues of the kind mentioned are oxidised in the liquid phase by gaseous oxygen containing gases percompounds are formed. These are only partly precipitated even with strong alkali solutions and substantial parts remain dissolved in the unchanged alkyl benzene, but will also yield phenols on treatment with acidic materials.

Although the textbooks refer generally to peroxides as the products of similar oxidation reactions we have found that the compounds formed in a number of cases are actually hydroperoxides. Throughout this specification, therefore, the expression "peroxide" is used to include hydroperoxides as well as peroxides.

According to the present invention the process for the production of a phenol comprises oxidising in the liquid phase a benzene homologue in which the benzene ring is substituted by at least one alkyl group one of which has a tertiary carbon atom in the alpha position to the benzene ring, by molecular oxygen containing gases to produce a peroxide therefrom, effecting the oxidation only to such an extent that the resulting reaction mixture contains a substantial amount of unchanged alkyl benzene and that about 10 to about 50% of the initial benzene homologue is converted into the corresponding peroxide, reacting at elevated temperatures the resulting mixture with an acid hydrogen ion exchange material until said peroxide in said alkyl benzene is practically completely decomposed, and recovering the phenolic compound thus produced.

Hydrogen ion exchange material suitable for effecting the decomposition are for instance sulphonated phenol formaldehyde resins, such as that known under the registered trade-mark "Zeocarb HIT," and sulphonated coals. The decomposition may be effected by bringing a solution of peroxide in unchanged alkyl benzene in intimate contact with the said acidic material at elevated temperatures. This may be achieved, for instance, by agitating the solution of peroxide in unchanged alkyl benzene with the hydrogen ion exchange material in fine comminution. Another way of achieving the object is to allow said solution to descend a tower or column filled with said material and heated to the reaction temperature. Suitable temperatures at which the decomposition is effected may vary within wide limits, up to 140° C., preferably at temperatures between 90 and 100° C. The heating may be carried out under increased pressure.

The oxidation of the alkyl benzene may be carried out by passing molecular oxygen or molecular oxygen-containing gases through the heated alkyl benzene in the presence or absence of inert solvents, such solvents are, for instance, toluene, xylene or the like.

An alternative method of carrying out the oxidation of said alkyl benzene comprises effecting the oxidation in an oil-in-water dispersion or emulsion at an elevated temperature advantageously in the presence of emulsifying agents such as sodium stearate or sodium ricinoleate, which facilitate the formation of and improve the dispersion or emulsification of the oily phase in the water.

The oxidation is stopped after about 10 to about 50% of the initial alkyl benzene has been converted into the corresponding peroxide. On increasing the proportion of peroxide in the reaction mixture beyond the upper limit indicated, the oxidation efficiency begins to drop and the process becomes less economical. In addition, the maximum concentration also depends on considerations of safety, since too high a concentration of peroxide might give rise to explosions. The minimum concentration of the peroxide in the unreacted alkyl benzene is governed by economic reasons.

When the oxidation is carried out by the above described method in an oil-in-water emulsion, and has been effected to the desired extent, the oil-in-water dispersion is allowed to break and the aqueous phase is then separated from the oily phase, for instance by decantation. The oily phase is then subjected to the decomposition process as described above by bringing it into intimate contact with the ion-exchange material.

By carrying out the process in this way it is possible to obtain high yields of phenols calculated on the total percompounds present in the reaction mixture. This is the more surprising in view of the presence of the initial alkyl benzene during the decomposition of the peroxides, which, according to previous knowledge might be expected to react with said alkyl benzene under the conditions prevailing during the decomposition.

The recovery of the products resulting from the process according to the present invention may be achieved in various ways, for instance by distilling the mixture resulting from the decomposition reaction whereby the unchanged alkyl benzene is obtained as distillate whilst the phenolic compounds remain in the still as residue.

As it is practically impossible to recover unchanged alkyl benzene used for the oxidation free from phenols by a mere fractional distillation of the reaction mixture it has been found advantageous to remove the remaining phenol from the accompanying recovered alkyl benzene by extraction, for instance, with an aqueous alkali metal hydroxide solution or by adsorption. This is found to be especially desirable if the recovered alkyl benzene is to be returned to the oxidation stage, as the presence of phenols in the mixture to be oxidised is found to have a deleterious effect on the oxidation or at least to reduce its rate very considerably.

It has further been found that the alkyl benzene fraction recovered from the process contains a small amount of styrene compounds for instance methyl styrene, and that the phenol fraction is sometimes contaminated by acetophenone. If the unchanged alkyl benzene is intended to be returned to the oxidation stage, it has been found to be advantageous to avoid the obnoxious effect of said styrenes by removing them. This may be done by hydrogenation of the styrenes e. g. in the liquid phase for instance at temperatures such as 90°–100° C. so that the said alkyl benzene remains unaffected, or by their removal, for instance by washing the fraction with sulphuric acid and/or alkali permanganate solution previous to its return to the oxidation step. The acetophenone is separated preferably by fractional distillation of the phenol fraction.

It is preferred to carry out the fractionation of the decomposition reaction mixture under reduced pressure, for instance, at 100 mm. Hg in order to avoid losses by condensation of the reaction products whereby high boiling compounds are formed.

Another method of working up the reaction products from the acid decomposition consists in distilling said products with live steam with fractionation. If, for instance, isopropyl benzene is the starting material for the oxidation on distilling the mixture containing the decomposition products of the peroxides a mixture of isopropyl benzene and water with only traces of phenol is obtained as distillate when the distillation is carried out at normal pressure at a temperature of between 93° and 95° C. From the aqueous residue phenol is recovered by distillation or preferably by extraction with a water immiscible solvent.

The process according to the invention may be carried out batchwise or continuously.

It should be understood, that the process applies to alkyl benzene hydrocarbons which are substituted by one or more alkyl groups, at least one of which has a tertiary carbon atom in the alpha position to the benzene ring in general, and that by phenolic compounds those phenols are meant which may contain, in addition to the hydroxy group, one or more alkyl groups as further substituents in the benzene ring.

The following examples illustrate the way in which the process may be carried out in practice.

*Example 1*

200 cc. of a solution containing 30 grams of isopropyl benzene peroxide in isopropyl benzene and obtained by oxidising isopropyl benzene at 130° C. with commercial oxygen was heated with 20 grams of hydrogen ion exchange material known under the trade name of "Zeocarb HIT" which is a sulphonated phenol formaldehyde resin, with agitation to 90° C. After one hour the peroxide had substantially disappeared. The phenol in the mixture amounted to 5.4 grams, equal to 56.8%.

*Example 2*

200 cc. of a solution containing 31 grams of isopropyl benzene hydroperoxide in isopropyl benzene was passed through a column charged with sulphonated coal. The column was heated externally to 95 to 100° C. and the residence time of the mixture in the column was 2 hours. 51% of the peroxide in the solution was converted into phenol.

We claim:

1. A process for the production of a phenol which comprises oxidising in the liquid phase a benzene homologue in which the benzene ring is substituted by at least one alkyl group one of which has a tertiary carbon atom in the alpha-position to the benzene ring by molecular oxygen containing gases to produce a peroxide therefrom, effecting the oxidation only to such an extent that the resulting reaction mixture contains a substantial amount of unchanged alkyl benzene and that about 10 to about 50% of the initial benzene homologue is converted into the corresponding peroxide, reacting at elevated temperatures the resulting mixture by intimate contact with an acidic hydrogen ion exchange material until said peroxide is practically completely decomposed, and recovering the phenolic compound thus produced.

2. A process according to claim 1 in which the hydrogen ion exchange material is a sulphonated phenol formaldehyde resin.

3. A process according to claim 1 in which the hydrogen ion exchange material is a sulphonated coal.

4. Process as claimed in claim 1 wherein the unchanged alkyl benzene is separated from the phenolic compound produced by distillation in the presence of water.

5. Process as claimed in claim 4 in which the distillate from the distillation in the presence of water is condensed and the alkyl benzene thus recovered is recycled for the production therefrom of fresh alkyl benzene peroxide, after it has been freed from any residual phenol.

6. A process for the production of phenol which comprises oxidising in the liquid phase isopropyl benzene with molecular oxygen to produce isopropyl benzene hydroperoxide therefrom, effecting the oxidation to such an extent that the resulting reaction mixture contains a substantial amount of unchanged isopropyl benzene and that about 10 to 50% of the initial isopropyl benzene is converted into isopropyl benzene hydroperoxide, reacting at elevated temperatures the resulting isopropyl benzene hydroperoxide dissolved in unchanged isopropyl benzene by intimate contact with an acidic hydrogen ion exchange material until said hydroperoxide is practically completely decomposed, and recovering phenol and acetone from said acid solution.

7. Process for the production of a phenol which comprises oxidising a benzene homologue in which the benzene ring is substituted by at least one alkyl group one of which has a tertiary carbon atom in the alpha position to the benzene ring by passing a molecular oxygen containing gas through an emulsion of said benzene homologue in water to produce a peroxide therefrom, effecting the oxidation only to such an extent that the resulting reaction mixture contains a substantial amount of unchanged alkyl benzene and that about 10 to about 50% of the initial benzene homologue is converted into the corresponding peroxide, separating the aqueous from the oily phase of said reaction mixture, reacting at elevated temperatures the peroxide in the oily phase by intimate contact with an acidic hydrogen ion exchange material until said peroxide is practically completely decomposed, and recovering the phenolic compound thus produced.

BASIL VIVIAN ALLER.
REGINALD HAROLD HALL.
DENIS CHESELDEN QUIN.
KARL HEINRICH WALTER TURCK.

REFERENCES CITED

The following references are of record in the file of this patent:

UNITED STATES PATENTS

| Number | Name | Date |
|---|---|---|
| 2,484,841 | Lorland | Oct. 18, 1949 |
| 2,527,640 | Lorland | Oct. 31, 1950 |

OTHER REFERENCES

Hock et al., Berichte, vol. 77 (1944) pages 257–264.

Sussmann, "Catalysis by Acid - Regenerated Cation Exchangers," Industrial & Engineering Chemistry, Dec., 1946, vol. 38, No. 12, pages 1228–30.